US007958003B2

(12) United States Patent
De Vries et al.

(10) Patent No.: US 7,958,003 B2
(45) Date of Patent: Jun. 7, 2011

(54) METHOD AND SYSTEM FOR WORK SCHEDULING ON CALENDARS TO ESTABLISH DAY STATE INFORMATION

(75) Inventors: Peter De Vries, Bellevue, WA (US); Jonathan S. Kaufthal, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1181 days.

(21) Appl. No.: 11/018,207

(22) Filed: Dec. 20, 2004

(65) Prior Publication Data
US 2006/0136241 A1    Jun. 22, 2006

(51) Int. Cl.
*G05B 19/418* (2006.01)
(52) U.S. Cl. .......................................................... 705/8
(58) Field of Classification Search ....................... 705/8
See application file for complete search history.

(56) References Cited

U.S. PATENT DOCUMENTS

| | | | | |
|---|---|---|---|---|
| 4,451,067 A | * | 5/1984 | Williams ........................ | 281/31 |
| 4,540,292 A | * | 9/1985 | Rubenstein et al. ............ | 368/29 |
| 5,233,533 A | * | 8/1993 | Edstrom et al. ................ | 700/103 |
| 5,271,172 A | * | 12/1993 | Ureta .............................. | 40/107 |
| 5,467,268 A | * | 11/1995 | Sisley et al. ................... | 705/9 |
| 5,787,000 A | * | 7/1998 | Lilly et al. ..................... | 700/95 |
| 5,867,822 A | * | 2/1999 | Sankar ............................ | 705/8 |
| 5,890,134 A | | 3/1999 | Fox ................................. | 705/9 |
| 6,049,776 A | * | 4/2000 | Donnelly et al. .............. | 705/8 |
| 6,073,110 A | * | 6/2000 | Rhodes et al. ................. | 705/8 |
| 6,088,626 A | * | 7/2000 | Lilly et al. ..................... | 700/100 |
| 6,101,480 A | | 8/2000 | Conmy et al. .................. | 705/9 |
| 6,111,572 A | * | 8/2000 | Blair et al. ..................... | 715/703 |
| 6,141,005 A | * | 10/2000 | Hetherington et al. ........ | 715/866 |
| 6,262,725 B1 | * | 7/2001 | Hetherington et al. ........ | 715/733 |
| 6,275,810 B1 | * | 8/2001 | Hetherington et al. ........ | 705/9 |
| 6,571,215 B1 | | 5/2003 | Mahapatro ..................... | 705/8 |
| 6,609,100 B2 | | 8/2003 | Smith et al. .................... | 705/8 |
| 6,957,188 B1 | * | 10/2005 | Dellevi et al. .................. | 705/9 |
| 7,246,076 B2 | * | 7/2007 | Vajracharya et al. .......... | 705/9 |
| 7,343,316 B2 | * | 3/2008 | Goto et al. ..................... | 705/9 |
| 7,349,920 B1 | * | 3/2008 | Feinberg et al. ............... | 1/1 |

(Continued)

OTHER PUBLICATIONS

Helen Bradley, "Organize Outlook, Organize Your Life", Aug. 14, 2002, WINPLANET / Softwre Downloads & Reviews for the Small Business / Tips & Tutorials. Web site: http://www.winplanet.com/article/1872-.htm, Web Archive Way Back Machine: http://web.archive.org/web/20040623074807//http://www.winplanet.com/article/1872-.htm, dates web site at Jun. 23, 2004.*

Special Edition Using Microsoft Project 2007 Quantum PM, LLC, May 2007, ISBN 0-7897-3652-7.*

Pyron, Tim, Special Edition Using Microsoft Project 2003 Que, Feb. 2004, ISBN 0-7897-3072-3.*

(Continued)

*Primary Examiner* — Scott L Jarrett
(74) *Attorney, Agent, or Firm* — Merchant & Gould P.C.

(57) ABSTRACT

A method of and system for handling allocation of task work to resources with flexibly configured availability contours (work calendars) is disclosed. The method includes defining one or more base calendars, a resource calendar associated with each resource, wherein the resource calendar inherits from a base calendar. A calendar reader, a set of recurring exception records, and a set of effective weeks for each calendar are also defined. For a specific date, the method determines whether an exception exists in one of the base calendar and resource calendar, and if an exception exists, computes a cached effective week honoring the exception data from an associated recurring exception record. If an exception does not exist, a cached effective week for the resource is computed from a combination of the calendar's standard week and associated effective week records.

13 Claims, 4 Drawing Sheets

U.S. PATENT DOCUMENTS

| | | | |
|---|---|---|---|
| 7,379,888 B1* | 5/2008 | Mahapatro | 705/8 |
| 7,478,051 B2* | 1/2009 | Nourbakhsh et al. | 705/9 |
| 2003/0187710 A1 | 10/2003 | Baumer et al. | 705/8 |
| 2004/0019542 A1* | 1/2004 | Fuchs et al. | 705/32 |
| 2004/0078257 A1 | 4/2004 | Schweitzer et al. | 705/9 |
| 2005/0004828 A1* | 1/2005 | deSilva et al. | 705/9 |
| 2005/0065832 A1* | 3/2005 | Virta | 705/8 |
| 2005/0216324 A1* | 9/2005 | Maithell et al. | 705/8 |
| 2005/0268501 A1* | 12/2005 | Feinstein | 40/110 |
| 2006/0212336 A1* | 9/2006 | Powers et al. | 705/9 |

OTHER PUBLICATIONS

Setting working times and days off using Project calendars Retrieved from Microsoft.com Apr. 7, 2004.*

Brown, Alex, Real-Life MS Project: Calendars Alexsbrown.com, 2003.*

Padwick, Gordon, Special Edition Using Microsoft Outlook 2002 Que, May 2001, ISBN 0-7897-2514-2.*

* cited by examiner

METHOD AND SYSTEM FOR WORK SCHEDULING ON CALENDARS TO ESTABLISH DAY STATE INFORMATION

TECHNICAL FIELD

The present invention relates to project management/scheduling software. More particularly, the invention is directed to project scheduling software that is flexible in its handling of resources which have specific and end-user defined availability contours (working times).

BACKGROUND OF THE INVENTION

In the field of project scheduling, often "tasks" (e.g., activities to be performed or completed) are assigned to "resources" (people, machines etc.). A task has a given amount of work associated with it (effort required to complete the task), usually specified in hours. The work value is a scalar value, which by itself is not relative to any particular time. For example, assume that a task entitled "Pour foundations for house" entails 12 hours of work (man hours of effort). In order to schedule this task, a starting date must be defined and the work assigned to various resources. For purposes of illustration, let us assume an arbitrary start date for this task of 8:00 AM on Monday Aug. 1, 2004.

In a conventional scheduling software product such as Microsoft® Office Project, a "calendar" defines when work can occur. In Project, each resource has an effective calendar associated with it. For example, assume a resource named "Bob" has a calendar that indicates he works 8 hours a day, 5 days a week (Monday-Friday). This exemplary calendar would include exact shift timings, thus for each weekday, assume there is a shift 8:00 am-12:00 pm and 1:00 pm-5:00 pm, which yield 8 available working hours per day. Assuming that Bob is the only resource assigned to the task "Pour foundations for house", the scheduling engine of Microsoft® Project is now able to determine when the task work is actually done. The engine begins at the task start date, and then plots the required task work (12 hours in this case) into the available shifts indicated by Bob's calendar. Since the task is starting on Aug. 1, 2004, a Monday, the scheduling engine will use the calendar functionality to determine what working time if any Bob has for Monday August 1. It will find that there are two shifts available on Monday, with 4 hours each. It will then plot 8 hours of the task work into the two shifts, leaving 4 hours remaining. Since work is still remaining, the engine will continue to scan Bob's calendar in the forward direction, looking for more available working time. The next day, August 2 is a Tuesday. Bob's calendar again indicates two shifts. Since only 4 hours remain, the calendar functionality will plot the remaining 4 hours into the first shift. Since the first shift ends at 12:00 PM, the engine is now able to determine that the task will actually be finished on Aug. 2, 2004, at 12:00 PM. This example is highly simplified. However, it illustrates how calendars are used by a scheduling software engine to turn generic task work requirements into absolute dates. The calendar functionality is at the core of a work-scheduling algorithm. The calendaring functionality ultimately determines when work can actually happen—thus it is critical that the routines that manage and interpret calendar data be as highly optimized as possible.

For the end user (project manager) of a product like Project, defining a calendar on a day-by-day basis can be extremely time consuming for a project that may have work spanning several hundred days. Thus, the concept of a "standard week" is used in order to simplify the process. This allows the user to specify the default working time for each weekday (Sunday-Saturday), to serve as the default definition for a given day. Of course, sometimes the user will wish to override a particular day (e.g. Saturdays may generally be non-working on a given calendar, but due to time constraints, the user may wish to indicate that a specific Saturday is in fact a working day). The deviations from the standard week are called "calendar exceptions".

There are algorithmic complexity implications associated with defining calendars via a "standard week" and then overriding select days with "exceptions". For large projects, there may be several hundred exceptions to track on a per calendar basis. Without care in the design of software architecture supporting this model, the scheduling software could be slowed to the extent that the product is non-viable.

In conventional project scheduling applications, the user is allowed to specify calendar "exceptions" for specific days. For example, a user can select a particular span of days (say Aug. 25, 2004 to Aug. 30, 2004) and indicate that for each of these days, a half-time shift was present (regardless of what the standard week definitions for those days might indicate). In real life usage, such calendar exceptions usually follow a pattern, so the fact that a conventional program forces the user to specify each span individually is often an inconvenience. For example, it may be necessary to mark every December 25 as a non-working day. If the project spans multiple years, the user would have to modify December 25 for each year individually.

Defining a calendar for each resource can be very tedious, especially when many of the resources have similar calendar structures. Further, typically there is only one definition of the "standard week" for each calendar. In other words, there is only one definition of Sunday, Monday, Tuesday etc. for each calendar. Any deviation from these weekday definitions requires the use of calendar exceptions. This limitation is particularly annoying in the scenario where the standard working week for a particular resource changes during the execution of a long term project.

For example, let us stipulate that a project starts August 1. Bob works on the project, and initially his work week is defined to be a standard 5-day work week, Monday-Friday, with two 4-hour shifts per day. Then, starting the week of August 15, Bob goes to half time on Tuesdays. The conventional scheduling program user must be very careful when effecting this change, because if he/she changes Bob's Tuesday definition, any changes or rescheduling of tasks with work scheduled prior to August 15 involving Bob on Tuesday may become inadvertently incorrect. The reason is that in a conventional scheduling program such as Microsoft® Office Project, there is only one definition for Tuesday for a given calendar. Any change to it immediately extends to all prior and future dates. Prior to August 15, Bob is in fact working full time on Tuesdays, but there is no way to indicate that except via specific calendar exceptions for each Tuesday prior to August 15 in the calendar—which the user might not initially think to add. It is with respect to these and other considerations that the present invention has been made.

SUMMARY OF THE INVENTION

In accordance with embodiments of the present invention, the above and other problems are solved by a method and system for scheduling work on calendars that flexibly and optimally accommodates both conceivable unique and recurring exceptions in otherwise standard calendar based scheduling software. A method of handling exceptions to the scheduling of tasks and resources allocated to tasks utilizing a scheduling engine in accordance with the present invention includes defining one or more base CALENDARs and a resource CALENDAR for each resource, wherein each resource calendar inherits from a base calendar. Each CALENDAR has a WEEK definition associated with it, called the "STDWeek" (or "standard week"). A CALENDAR READER, a set of RECURRING EXCEPTION records, and a set of EFFECTIVE WEEK records for each calendar are also defined. To determine the availability indicated for any given day by a given CALENDAR the method determines whether an EXCEPTION OCCURRENCE is found in one of the base CALENDAR and resource CALENDAR, and if an exception occurs, computes a cached effective WEEK honoring the exception data found in the associated RECURRING EXCEPTION record. If an exception does not occur, the cached effective WEEK for the resource is computed from the "STDWeek" and any EFFECTIVE WEEK records (if present). In either case, the cached effective week contains day state (shift) information for the resource for each day weekday of the calendar week containing the initially requested date. The cached effective week is then used by the scheduling engine to determine exact availability of the resource for the initially requested day.

An embodiment of the present invention may also be viewed as a system that includes a processor and a memory coupled with and readable by the processor. The memory contains a series of instructions that, when executed by the processor, cause the processor to define one or more base CALENDARs and a resource CALENDAR associated with a resource. The resource CALENDAR inherits from a base CALENDAR. The processor also defines a CALENDAR READER, a set of RECURRING EXCEPTION records, and a set of EFFECTIVE WEEK records for each calendar. When the day state (shifts) for a particular day of a particular CALENDAR are required, the processor determines whether an exception exists in one of the base CALENDAR and resource CALENDAR. If an exception exists, it computes a cached effective week honoring the exception data found in the associated RECURRING EXCEPTION record. If an exception does not occur, it computes a cached effective week for the resource from "STDWeek" and any EFFECTIVE WEEK records (if present). In both cases, the generated effective week is cached for subsequent use in establishing day state information for the resource for each weekday of the calendar week surrounding the initially requested date.

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its improvements can be obtained by reference to the accompanying drawings, which are briefly summarized below, and to the following detailed description of presently preferred embodiments of the invention, and to the appended claims.

DETAILED DESCRIPTION OF THE INVENTION

Figure 1:
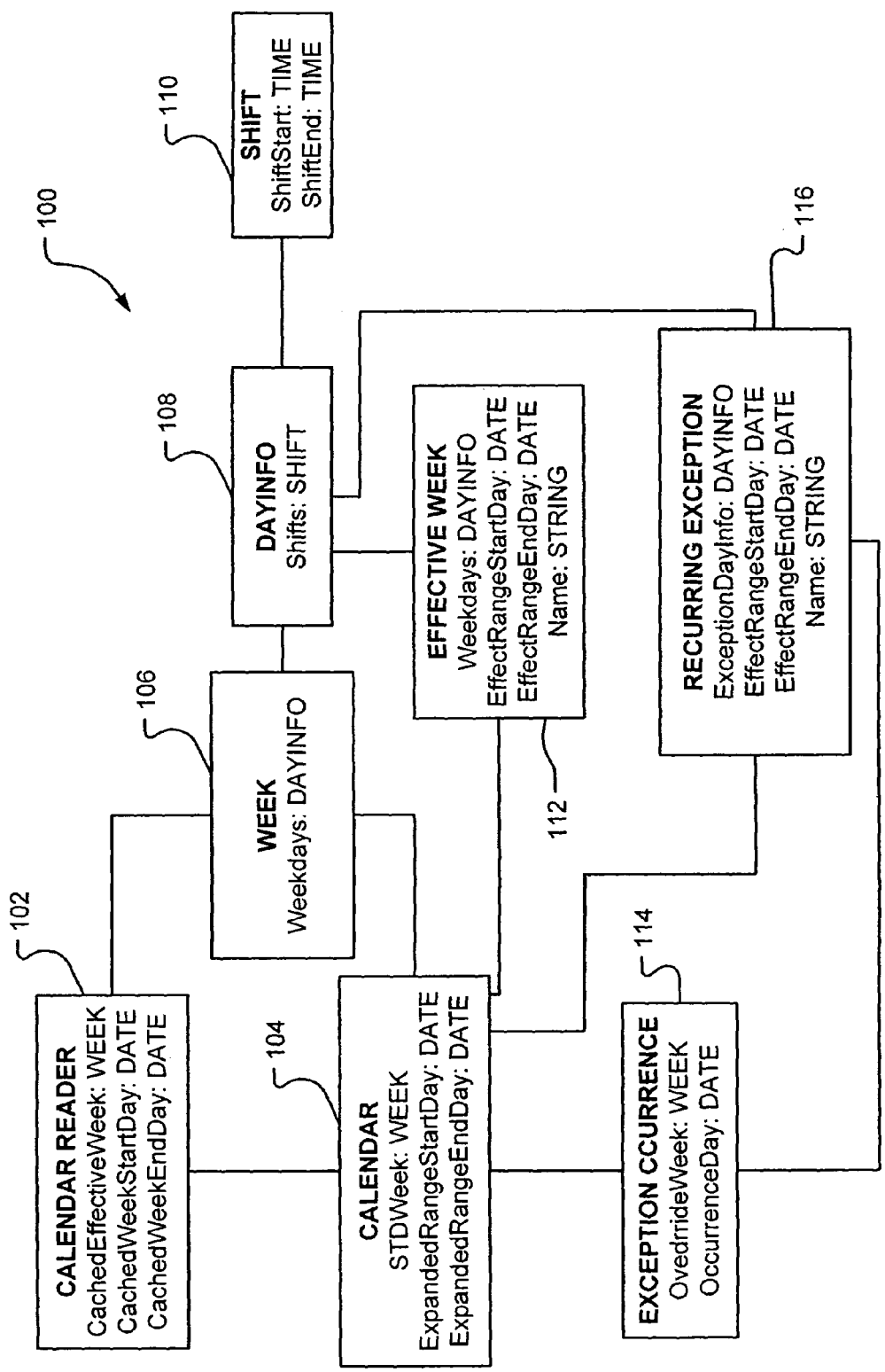
FIG. 1 illustrates an exemplary diagram of the object classes and their relationships according to an exemplary embodiment of the present invention.

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In accordance with embodiments of the invention, the methods described herein may be performed on a single, stand-alone computer system but are more typically performed on multiple computer systems interconnected to form a distributed computer network.

A method of and system for handling allocation of task work to resources with flexibly configured availability contours (work calendars) is disclosed. The method includes defining one or more base calendars, a resource calendar associated with each resource, wherein the resource calendar inherits from a base calendar. A calendar reader, a set of recurring exception records, and a set of effective weeks for each calendar are also defined. For a specific date, the method determines whether an exception exists in one of the base calendar and resource calendar, and if an exception exists, computes a cached effective week honoring the exception data from an associated recurring exception record. If an exception does not exist, a cached effective week for the resource is computed from a combination of the calendar's standard week and associated effective week records. The cached effective week is contains day state information (working shifts) for the resource for each weekday of the calendar week surrounding the initially requested date. The cached effective week can then used by a scheduling engine to schedule task work for the resource honoring the intended availability contour. The disclosure can also be thought of as describing a system which includes a processor and a memory coupled with and readable by the processor. The memory contains a series of instructions that, when executed by the processor, cause the processor to define one or more base calendar and a resource calendar associated with each resource. Each resource calendar inherits from the base calendar. The processor also defines a calendar reader, a set of recurring exception records, and a set of effective week records for each calendar. For a specific date, the processor determines whether an exception exists in one of the base calendar and resource calendar. If an exception exists, it computes a cached effective week including the exception from the associated recurring exception record. If an exception does not exist, it computes the cached effective week using a combination of the calendar's standard week and associated effective week entries. In both cases, the cached effective week is kept for subsequent use in establishing day state information (shift times) for the resource for each weekday of the calendar week surrounding the initially requested date.

FIG. 1 illustrates a calendar infrastructure 100 in accordance with an embodiment of the present invention showing the major object classes and the relationship between major object/entity types. Infrastructure 100 contains a CALENDAR READER 102 which reads a CALENDAR 104. The CALENDAR contains an instance of the WEEK class 106 called "STDWeek" which represents the standard work week for the CALENDAR. The CALENDAR READER also contains a WEEK instance to hold the "CachedEffectiveWeek" (102). A WEEK consists of seven instances of the DAYINFO class 108 (one for each weekday). The DAYINFO class contains zero, one or more SHIFT 110 instances. Each SHIFT instance contains information relating to one work shift. The EFFECTIVE WEEK class 112 allows additional named week definitions to be added to the calendar. Instances EFFECTIVE WEEK class contain a WEEK instance named "OverrideWeek", which used instead of the CALENDAR's STDWeek for the dates the EFFECTIVE WEEK record is effect. Instances of the RECURRING EXCEPTION class 116 allow recurring exceptions to be added to the CALENDAR. A RECURRING EXCEPTION instance implies one or more recurrences (instances) of the exception, each of which are held in EXCEPTION OCCURRENCE class 114.

The calendar functionality in embodiments of the present invention is classically invoked from the context of a critical path (task) scheduling functionality (a task scheduling engine). It could however be invoked from other environments. The mechanism or module which invokes the calendar functionality is considered to be a client of the functionality. The purpose of a calendar functionality is to answer these general questions for its client in an achievable manner as exemplified by the following:

What does a particular, single day of an effective calendar look like in terms of available working shifts? (within this embodiment: what is the effective DAYINFO for a particular DATE?)

Given a start date and time and an end date and time, what is the amount of working time (in effort hours) between these two time indices on a given effective calendar?

Given a start date and an amount of working time (i.e. 12 effort hrs), what is the actual end date on a given effective calendar that is reached when the work is plotted?

Given an end date and an amount of working time, scanning forwards, what is the actual start date on a given effective calendar?

We will now discuss the major elements (object classes) of the infrastructure in more detail.

The DAYINFO class 108 indicates the working time available for a particular day in terms of 0 to 5 SHIFTs 110. A 0 shift day is a non-working day. The DAYINFO (day) is the smallest unit of time the calendar infrastructure generally deals with.

An instance of the SHIFT class 110 defines a single work period (a shift) in terms of a start time and end time in a generic 24 hour day (e.g. Start: 8:00 AM, Stop: 12:00 AM). A standard 8 hour work day with one hour for lunch may then be represented as two SHIFTs, the first Start: 8:00 AM Stop: 12:00 PM, the second Start: 1:00 PM Stop: 5:00 PM. A SHIFT can have arbitrary stop and stop times which can be defined by a user. SHIFTS in a single DAYINFO cannot overlap. The SHIFTs are stored in the present embodiment in sorted (earliest to latest) order.

The instances of the WEEK class 106 stores seven DAYINFOs, one for each weekday. This is a standard convention, as all major world calendars are delineated in seven day weeks. The WEEK class is used by other classes which need to store date state information in week increments. In particular the CALENDAR class uses it to represent the STDWeek, the EFFECTIVE WEEK class uses it to represent the OverrideWeek and the CALENDAR READER uses it to represent the CachedEffectiveWeek.

An instance of the RECURRING EXCEPTION class 116 provides, in the form of a rule, information necessary to determine when the exception occurs. It could, for example, contain the rule "every 3rd Tuesday is an exception". It is implicit then, that every 3rd Tuesday between the EffectiveRangeStartDay and the EffectiveRangeEndDay field of the RECURRING EXCEPTION record is an exception day. However, the identities of the actual occurrence days are not stored within the record. Exception occurrences are represented by EXCEPTION OCCURRENCE 114 records. The RECURRING EXCEPTION record stores a single DAYINFO ("ExceptionDayInfo" in class 116). The ExceptionDayInfo will be used for each day the exception occurs on. Each RECURRING EXCEPTION record can also have a name associated with it.

Instances of EXCEPTION OCCURRENCE class 114 hold the individual exception occurrences. These records are contained within to the CALENDAR 104 instance. The EXCEPTION OCCURRENCE records are small and contain only the date of the occurrence and a reference to the RECURRING EXCEPTION record in class 116 that is generating the occurrence. The EXCEPTION OCCURRENCEs are calculated at runtime and only when required. Each CALENDAR records the date range (or "window") indicated by ExpandRangeStartDay and ExpandRangeEndDay (in class 104) for which occurrence records have been generated. This range is initially empty and is increased in size as CALENDAR READER 102 requires the information.

The EFFECTIVE WEEK class 112 provides the user with a capability to add supplemental week definitions to the CALENDAR (in addition to the mandatory STDWeek). The EFFECTIVE WEEK record has a start and end date field (EffectRangeStartDay and EffectRangeEndDay in class 112), which indicate for which dates the STDWeek should be ignored, and the week definition contained with the EffectiveWeek record (the "OverrideWeek") used instead. Each EFFECTIVE WEEK record can also be named.

CALENDAR instances 104 contain all the information pertaining to a single calendar (a calendar record). The same type of record is used for both base (generic) calendars and resource calendars. This single record typically includes the following:

The calendar's name.

Definition of its standard week (Sunday-Saturday) in terms of seven DAYINFOs. This WEEK instance is called the "STDWeek".

A set of RECURRING EXCEPTIONS records.

A set of EFFECTIVE WEEK records.

If this CALENDAR inherits from anther, the CALENDAR will contain a pointer to another CALENDAR record that should serve as the "base calendar" for this record. This is an "inheritance concept". In a scheme in which, there are at maximum one level of inheritance, a "base calendar" never inherits off of another base calendar, so this pointer field would not be used. Preferably the "resource calendar" always inherits from a single "base calendar" although other embodiments are envisioned in which there may be multiple dependencies.

Since calendar inheritance is allowed in this invention, some elements of the CALENDAR's configuration may be described as "from base calendar" or "unspecified". The CALENDAR instances are generally persisted in a file along with the rest of the project data. A user interface is provided in a conventional manner to allow the user to manipulate individual calendar records (e.g. change names, change exception and effective structures etc.) as well as to manipulate the relationship between calendars (i.e. to indicate which calendar is a base calendar for another).

In addition to the above fields, which are all persisted between sessions, there is another run-time only generated member of the CALENDAR record:

An expanded occurrence "window", which contains EXCEPTION OCCURRENCE records, one for each individual occurrence of a RECURRING EXCEPTION. Initially this window is empty, but it is increased in size (and thus gains more records) as the calendar is used in scheduling operations.

In the present embodiment, the client uses the CALENDAR READER 102 to read the CALENDARs. The CALENDAR READER allows the client to ask abstract questions relating to the calendar structure. The purpose of the CALENDAR READER is to abstract knowledge of the physical storage structure of the calendar (and related optimizations) from the client (i.e. to make it so that these architectural details are transparent to the client). In general, the client will want to know the day state (DAYINFO) for a particular day. It is up to the CALENDAR READER to honor all the rules of the calendaring system, including recurring exceptions, effective weeks, resource calendars and base calendars (i.e. calendar inheritance) to determine the DAYINFO. Since the client is generally heavily reliant on the calendar functionality to do its own work, the functionality must be as fast as possible. The CALENDAR READER coordinates a number of optimizations whose purpose is to minimize the time required to answer the client's questions.

The "CALENDAR READER" objects 102 are in contrast to the CALENDAR objects 104 in that they are never persisted, i.e., saved to non-volatile memory, and are not directly or indirectly exposed to the user via the user interface. The CALENDAR READER 102 objects can be thought of as accessor objects to a particular effective calendar configuration. An "effective calendar" is a runtime only calendar whose structure (STDWeek, exceptions, effective weeks etc.) is implied by the overlay of (inheritance by) a resource calendar over a base calendar.

For each effective calendar (i.e. for each unique combination of calendars in an inheritance relationship), a CALENDAR READER object is instantiated by the client. The CALENDAR READER object is generally cached by the client for future operations on this calendar. The CALENDAR READER object contains information on the effective calendar implied by the inheritance relationships, such as:

Pointers to all the CALENDAR records which are being overlaid to produce the effective calendar. These records are stored in the order of inheritance. In the embodiment described herein, since there is only one level of inheritance (resource calendar inheriting from base calendar), there will be at most two records. In other embodiments having a greater level of inheritance, e.g. 2, 3 or more levels, there may be additional records involved.

A computed effective standard week (the "CachedEffectiveWeek"), and its range of effect ("CachedWeekStartDay" and "CachedWeekEndDay").

Information relating to the nearest relevant EXCEPTION OCCURRENCE records in each of the CALENDAR records that are part of the inheritance relationship.

Figure 3:
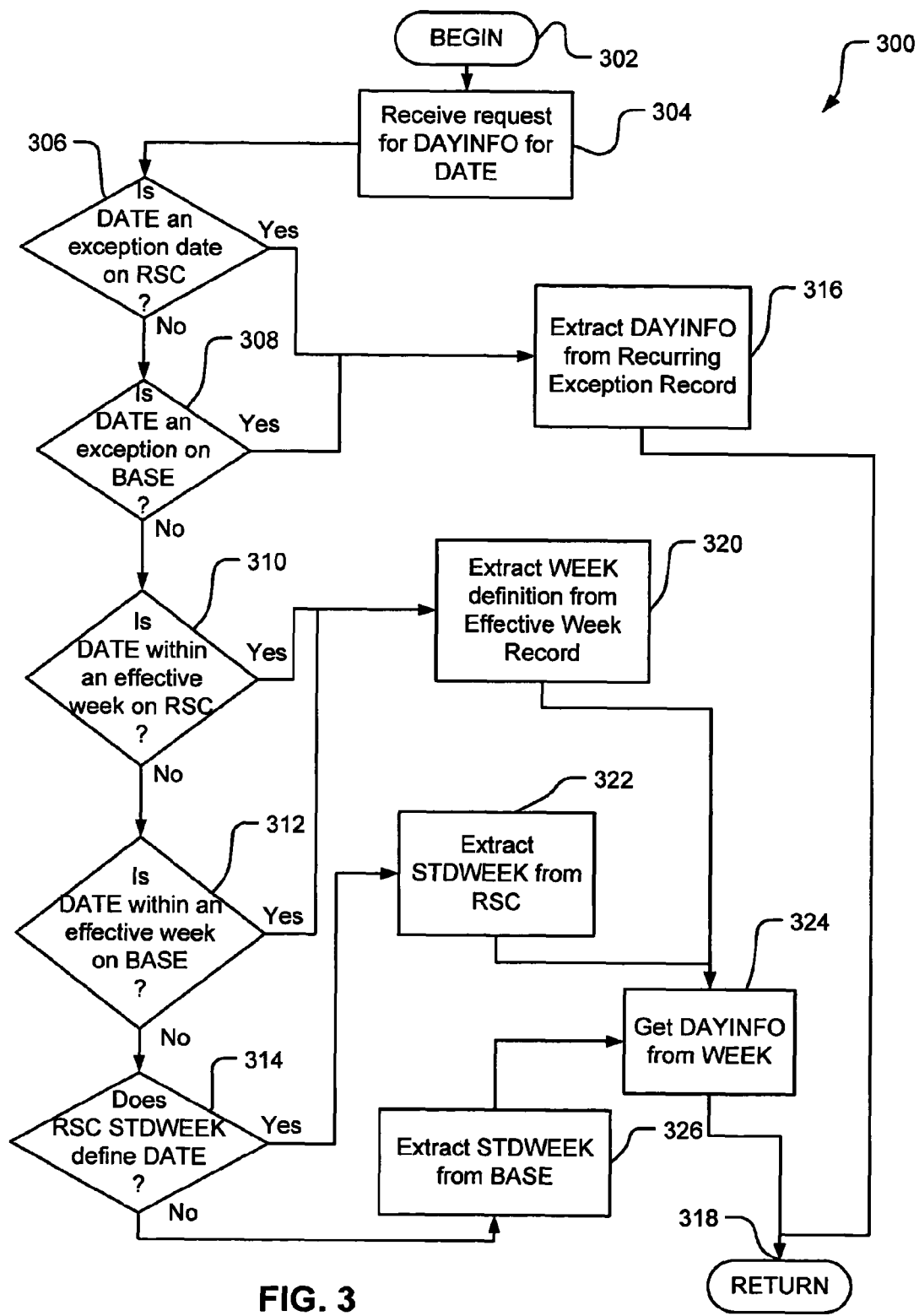
FIG. 3 is a simplified (abstract) logical flow diagram of a DAYINFO (day state) resolution process in accordance with an embodiment of the present invention.
Figure 4:
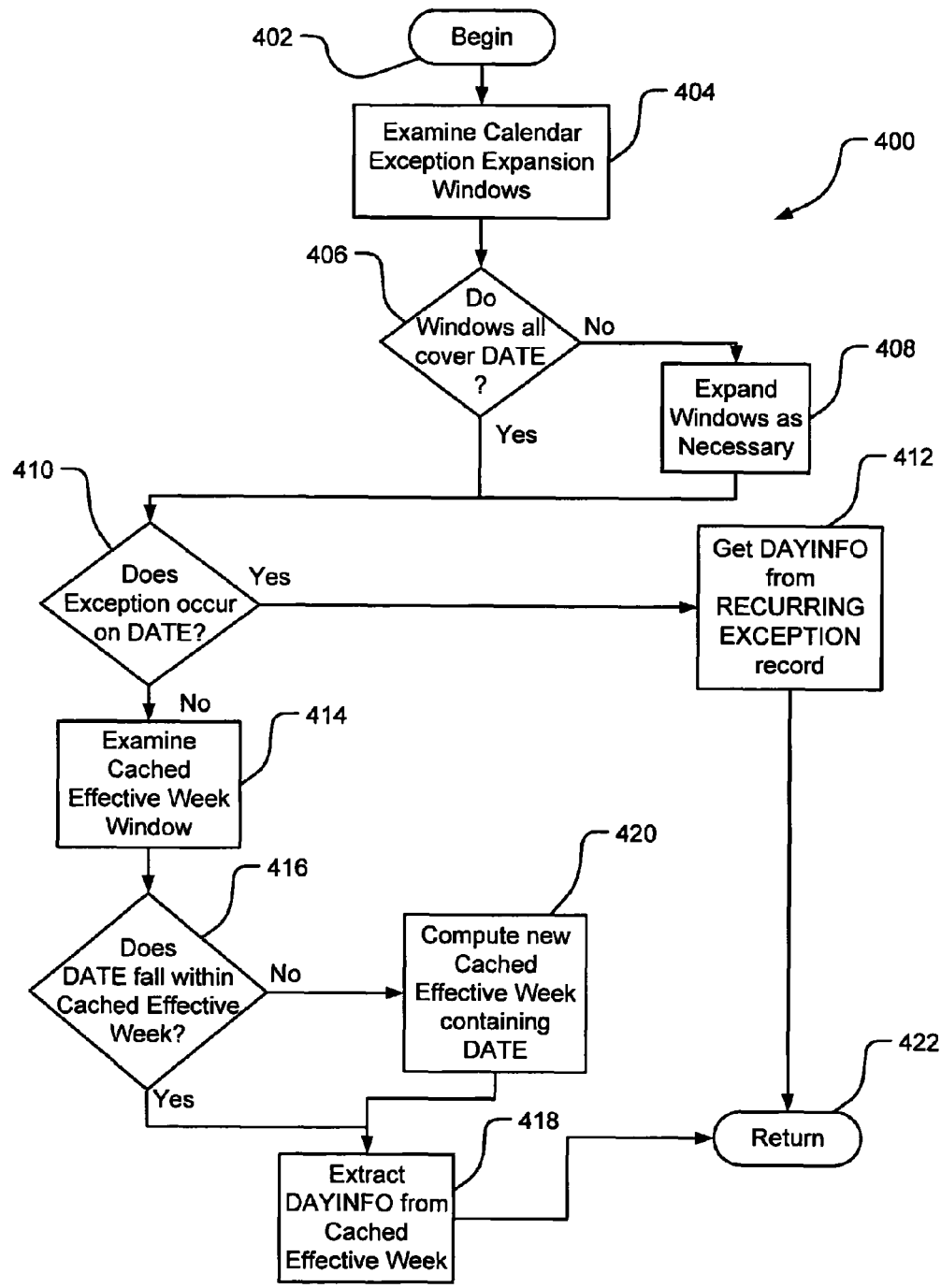
FIG. 4 is a more detailed logical flow diagram of a DAYINFO (day state) resolution process actually used by the CALENDAR READER in accordance with the embodiment of the present invention shown in FIG. 1.

FIG. 3 shows abstractly the process the CALENDAR READER uses to determine what DAYINFO applies for a particular day. This is the process that a human operator might use to informally verify the implementation of the CALENDAR READER. FIG. 4 shows the actual day state (DAYINFO) resolution process employed by the CALENDAR READER, including elements of various optimizations that are designed to increase the execution speed in common usage scenarios.

When a Calendar Reader 102 is asked for the state of a specific day, assuming no exception at any calendar level applies to the day, it must use the definition from the standard week ("STDWeek"). By way of example, assume that a CALENDAR READER 102 instance is asked for the day state of Aug. 11, 2004, a Tuesday. It is implied that the CALENDAR READER has been configured to read the configuration of some effective calendar. Assume that the CALENDAR READER has not previously been queried for any information. Also assume that no exception occurs at any calendar level on Aug. 11, 2004. Such a request kicks off a process in which the CALENDAR READER 102 will generate a CachedEffectiveWeek for the effective calendar. The CachedEffectiveWeek will be correct for the dates surrounding the subject date (August 11). In this case it will want to generate the week Sunday-Saturday, August 8 to August 14. In doing so, it evaluates each calendar level, looking at the STDWeek in each calendar and any EFFECTIVE WEEK records that may impact the day states of August 8 to the 14. As it does so, it calculates any limiting dates for the CachedEffectiveWeek it is building. For example, if as it scans the calendar levels, it discovers that an EFFECTIVE WEEK record on some calendar level that is impacting the week August 8-14, (perhaps the effective week has an effective date range of August 1-August 25), then it makes note of the fact that the CachedEffectiveWeek it is generating could not be valid at any point previous to August 1, nor any point past August 25. These constraining dates are stored in the "CachedWeekStartDay" and "CachedWeekEndDay" fields of the CALENDAR READER.

Eventually the CALENDAR READER will build up a CachedEffectiveWeek which correctly honors all the structural elements of all the CALENDARs involved in the effective calendar. It will also know the date span for which this calculated week is valid. This span could be as short as the original week itself (in this case August 8-14) if the subject week happens to fall on the borders of some EFFECTIVE WEEK record in the calendar configuration. The CALENDAR READER 102 caches this information for future use, and then returns the calculated definition for Tuesday in the CachedEffectiveWeek as the effective day state of Aug. 11, 2004.

Now, if the CALENDAR READER 102 is asked for the definition of Aug. 12, 2004, assuming that no exception governs this day, the CALENDAR READER 102 can simply return the stored definition for Wednesday from the CachedEffectiveWeek. The CachedEffectiveWeek can be used for as long as it is valid. Assume that it had been calculated to be valid from August 1 to August 25. Even if the reader was asked for the state of Aug. 16, 2004 (the next Monday), as long as no exception is impacting the day, it can return the calculated definition for Monday. The CachedEffectiveWeek can be used until the CALENDAR READER 102 is asked for a date outside the range of validity for the CachedEffectiveWeek (i.e. for a date outside of "CachedWeekStartDay" and "CachedWeekEndDay"). Assume that the CALENDAR READER is asked for a date outside the validity range of the CachedEffectiveWeek. The CALENDAR READER 102 would then delete the CachedEffectiveWeek, and regenerate a new one using the same process for the new date.

There are a couple of critical assumptions underlying this approach:

Clients of the CALENDAR READER will tend to ask for information about sequential days.

Exception occurrences will be relatively rare.

EFFECTIVE WEEKS will be relatively rare, and when they do occur, they will tend to have large effective date span ranges.

If these assumptions hold, then generating and storing the CachedEffectiveWeek in the CALENDAR READER 102 will be a performance benefit. This discussion assumes that no exceptions are occurring during the days in question. In practice, exceptions can occur and the CALENDAR READER 102 must check for them. As the CALENDAR READER 102 is asked for the state of a particular day, it queries each CALENDAR in the effective calendar for any EXCEPTION OCCURRENCEs that may be applicable. It records the nearest occurrence for each calendar for the subject day and caches that information within the CALENDAR READER 102. By doing this, if clients of the CALENDAR READER 102 make sequential requests, it can rapidly determine whether or not an exception is impacting the requested day, and if not, quickly respond to the request by using the information in the CachedEffectiveWeek.

When the CALENDAR READER needs to determine if an exception may be affecting a particular date, it consults the EXCEPTION OCCURRENCE 114 records in the relevant CALENDARs. EXCEPTION OCCURRENCE records are run time only, and are generated only as necessary. When the CALENDAR READER goes to inspect the EXCEPTION OCCURRENCE records, it first determines if the exception expansion window includes the date it is about to enquire about. The expansion range is indicated by the "ExpandedRangeStartDay" and "ExpandedRangeEndDay" fields of the CALENDAR instance. If the date is outside the range, the CALENDAR READER grows the expansion range to include the subject date. This process involves the CALENDAR READER inspecting all the RECURRING EXCEPTION records on the CALENDAR for potential occurrences and generating any new EXCEPTION OCCURRENCE records implied by the new window size. The volume of EXCEPTION OCCURRENCE records generated on a given CALENDAR directly affects the speed at which the CALENDAR READER can determine whether or not an exception is occurring for a given day on that CALENDAR. The goal is to minimize the number of EXCEPTION OCCURRENCE records to the minimum necessary for correct results in order to maximize performance.

Since CALENDAR READER 102 objects contain information generated from, and dependent on, the content within the various CALENDAR records and their inheritance relationships, any change to CALENDAR configurations by the user generally requires that all CALENDAR READER 102 objects are invalidated and regenerated.

Figure 2:
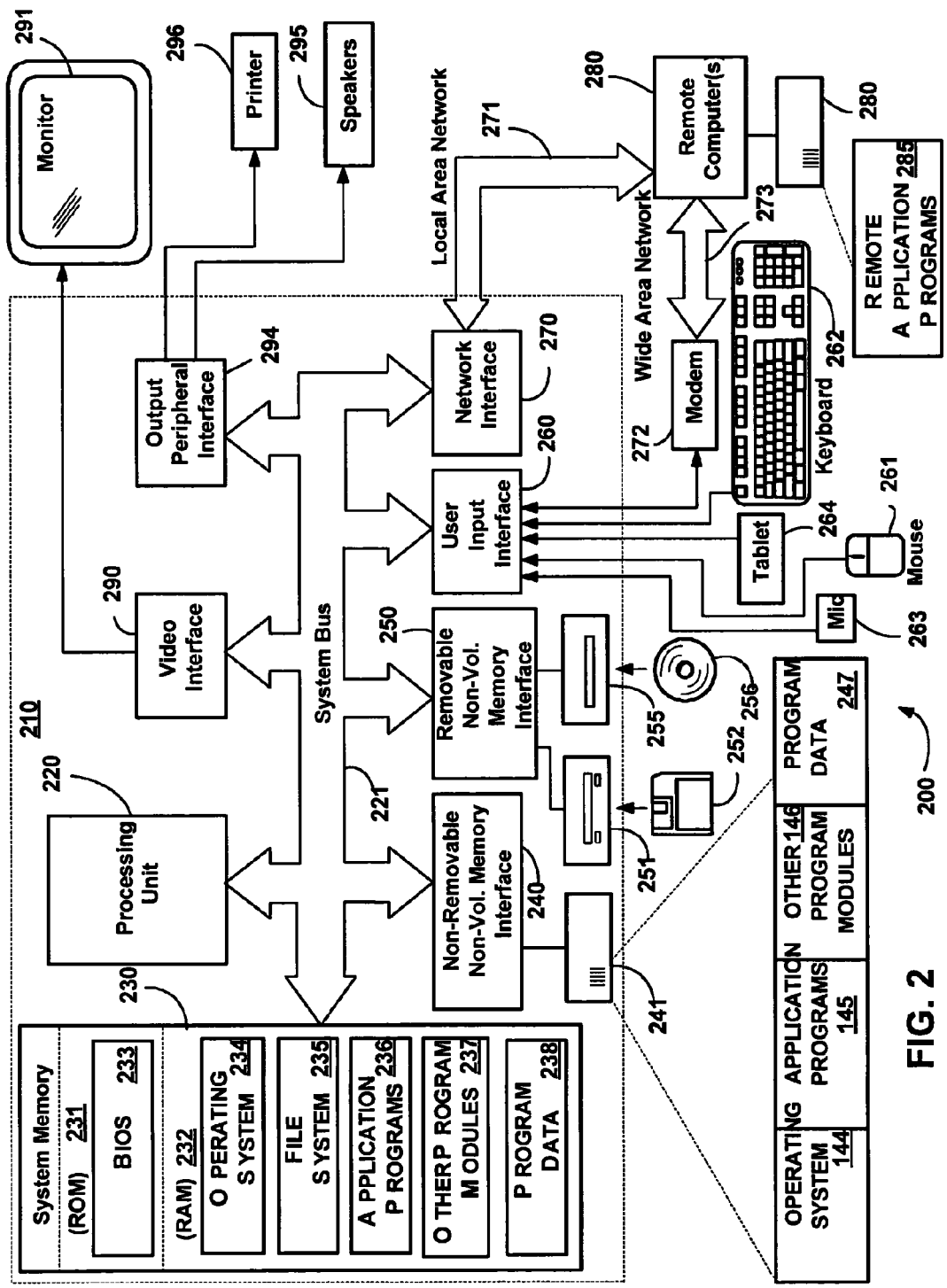
FIG. 2 shows a computer system environment that may incorporate software operating according to particular aspects of the present invention.

FIG. 2 illustrates an exemplary environment 200 for implementing an embodiment of the invention. This environment 200 includes a general purpose computing device in the form of a computer 210. Components of the computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Accelerated Graphics Port (AGP) bus, and Peripheral Component Interconnect (PCI) bus also known as Mezzanine bus.

The computer 210 typically includes a variety of computer-readable media. Computer-readable media can be any available media that can be accessed by the computer 210 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 210. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules that are immediately accessible to and/or presently being operated on by processing unit 220. By way of example, and not limitation, FIG. 4 illustrates operating system 234, application programs 235, other program modules 236 and program data 237.

The computer 210 may also include other removable/non-removable, volatile/nonvolatile computer storage media. By way of example only, FIG. 2 illustrates a hard disk drive 241 that reads from or writes to non-removable, nonvolatile magnetic media, a magnetic disk drive 451 that reads from or writes to a removable, nonvolatile magnetic disk 452, and an optical disk drive 255 that reads from or writes to a removable, nonvolatile optical disk 256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media, discussed above and illustrated in FIG. 2, provide storage of computer-readable instructions, data structures, program modules and other data for the computer 210. In FIG. 2, for example, hard disk drive 241 is illustrated as storing operating system 244, application programs 245, other program modules 246 and program data 247. Note that these components can either be the same as or different from operating system 234, application programs 235, other program modules 236, and program data 237. Operating system 244, application programs 245, other program modules 246, and program data 247 are given different numbers herein to illustrate that, at a minimum, they are different copies. A user may enter commands and information into the computer 210 through input devices such as a tablet (electronic digitizer) 264, a microphone 263, a keyboard 262 and pointing device 261, commonly referred to as mouse, trackball or touch pad. Other input devices (not shown) may include a joystick, game pad, satellite dish, scanner, or the like. These and other input devices are often connected to the processing unit 220 through a user input interface 160 that is coupled to the system bus, but may be connected by other interface and bus structures, such as a parallel port, game port or a universal serial bus (USB). A monitor 291 or other type of display device is also connected to the system bus 221 via an interface, such as a video interface 290. The monitor 291 may also be integrated with a touch-screen panel 293 or the like that can input digitized input such as handwriting into the computer system 210 via an interface, such as a touch-screen interface 292. Note that the monitor and/or touch screen panel can be physically coupled to a housing in which the computing device 210 is incorporated, such as in a tablet-type personal computer, wherein the touch screen panel 293 essentially serves as the tablet 264. In addition, computers such as the computing device 210 may also include other peripheral output devices such as speakers 295 and printer 296, which may be connected through an output peripheral interface 294 or the like.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN networking environment, the computer 410 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260 or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are exemplary and other means of establishing a communications link between the computers may be used.

With the computing environment 200 in mind, embodiments of the present invention are described with reference to logical operations being performed to implement processes embodying various embodiments of the present invention. These logical operations are implemented (1) as a sequence of computer implemented steps or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Turning now to FIG. 3, when the CALENDAR READER 102 requests information for a particular date, the DAYINFO resolution process is invoked. Process 300 is an exemplary implementation to determine characteristics of a particular specific date, i.e., the DAYINFO 108 for a particular day on a given effective calendar. Process 300 shows the methodology in an abstract manner. Process 300 begins in operation 302. Control then transfers to operation 304 where the process recognizes that a request for the day state (DAYINFO) for a particular DATE has been received. The DAYINFO class describes the valid working times or shifts for a particular day for a particular resource (person, machine, etc.). Control then transfers to query operation 306.

In query operation 306, the query is made whether the DATE is an exception date on the resource calendar (RSC). Each resource, such as a person, machine, etc. that has been defined has a unique resource calendar associated with it. It is derived from a base calendar (BASE). A resource calendar is always associated with one base calendar. A base calendar may be associated with one or more resource calendars. In general, the resource calendar "inherits" all the attributes (exceptions, effective weeks, and standard week) of the base calendar. The resource calendar can then selectively override, or redefine, one or more of these elements, or add new ones.

Informally, an "exception date" is a date in which a RECURRING EXCEPTION 116 occurs from a given calendar has an occurrence. If, in query operation 306, the DATE is not an exception date on the resource calendar, control transfers to query operation 308. If the DATE is an exception date on the resource calendar, control transfers to operation 316 which is described further below.

In query operation 308, the query is made whether the DATE is an exception date on the base calendar (BASE). If the answer in query operation 308 is yes, the DATE is an exception date on the base calendar, control transfers to operation 316. In operation 316, the DATE has been identified as an exception date. Since an exception is governing DATE, the DAYINFO is extracted from the RECURRING EXCEPTION record 116 generating the exception occurrence and control passes to return operation 318 where process control returns to the client.

In query operation 308, if the answer is no, the DATE is also not an exception date on the base calendar, control passes to query operation 310. In query operation 310, the question is asked whether the DATE is within an EFFECTIVE WEEK 112 defined on the resource calendar. An EFFECTIVE WEEK records effects a date if the date is between the "EffectRangeStartDay" and "EffectRangeEndDay" values of the record (112). If so, control transfers to operation 320. If not, control transfers to query operation 312.

In query operation 312, the question is asked whether the DATE is within an EFFECTIVE WEEK on the base calendar. If the answer is yes, control transfers to operation 320 where a WEEK 106 that includes the DATE is extracted from the EFFECTIVE WEEK record 112 (the "OverrideWeek" field). Control then passes to operation 324. If the answer in query operation 312 is no, the DATE is not within in EFFECTIVE WEEK on the base calendar. Control transfers to query operation 314.

Query operation 314 asks whether the resource calendar defines the weekday for DATE in its standard week (STDWEEK). Since the architecture allows inheritance, although the resource calendar will always have a STDWeek, the weekday entry for DATE may be marked as "retrieve from base calendar". If the resource calendar's STDWeek defines DATE's weekday, control transfers to operation 322 where the STDWeek definition (a WEEK 106 instance) of the resource calendar is extracted. If the resource calendar does not define a DATE's weekday in its STDWeek, control transfers to operation 326.

In operation 326, the STDWeek of the base calendar is assumed to be the source of the day state for DATE. This is the state of "last resort". It is stipulated that all weekdays in the STDWeek of a base calendar must be defined, hence it is always possible to get a DAYINFO for any particular DATE at this state. Thus, either the resource calendar or base calendar will provide a STDWeek which has a valid weekday definition corresponding to DATE. Control then passes to operation 324.

In operation 324, the DAYINFO for the DATE is extracted from the WEEK. The WEEK comes from either the EFFECTIVE WEEK record (i.e. from operation 320), or from a STDWeek (i.e. from operation 322 or 326). Control then passes to return operation 318, where the DAYINFO for the DATE is passed back to the client of the calendar functionality. At this point, the client can use the shift times contained within the DAYINFO to accurately determine when work, i.e. effort hours, can physically occur on the day.

A CALENDAR READER 102 instance and is generally maintained by the client of the calendar functionality for each effective calendar in use in a project plan. The client of the calendar functionality is typically a critical path task scheduler. An exemplary optimized resolution process for the DAYINFO of a particular DATE by a CALENDAR READER 102 instance in accordance with the present invention is shown in FIG. 4. The process begins in operation 402. We assume that the client has just requested the DAYINFO for a particular DATE on a particular effective calendar from the CALENDAR READER. Control then passes to operation 404, where the request is received and examined. Here all the CALENDARs 104 in the effective calendar are examined to determine whether their exception occurrence windows cover DATE. In other words, the objective is to determine whether the DATE is between the "ExpandedRangeStartDay" and "ExpandedRangeEndDay" fields of each CALENDAR in the effective calendar. Control then passes to query operation 406.

In query operation 406, the question is asked whether the windows all cover the DATE requested. If so, control transfers to query operation 410. If, however, the windows do not all cover the DATE, control passes to operation 408, where the windows are expanded. Here the windows of all CALENDARs associated with the CALENDAR READER instance (i.e. those calendars that combine to build the effective calendar being queried) are expanded to include the DATE. The expanded windows are never contracted during subsequent queries. All occurrences of all the RECURRING EXCEPTIONs on a given CALENDAR between the window dates are remembered for future reference. This expansion process causes EXCEPTION OCCURRENCE records to be added to the CALENDAR instance. The "ExpandedRangeStartDay" and "ExpandedRangeEndDay" fields are modified accordingly. Control then transfers to query operation 410.

In query operation 410, the query is made whether there is an exception on DATE. This is accomplished by examining the EXCEPTION OCCURRENCE records for each CALENDAR associated with the CALENDAR READER. The calendars are consulted for exception occurrences in inheritance order (i.e. resource calendar before base calendar). If there is an exception occurrence on DATE, control transfers to operation 412, where the DAYINFO for DATE is obtained from the RECURRING EXCEPTION record 116 generating the occurrence. If there is no exception occurring on DATE, control transfers to operation 414.

Operation 414 examines the window of validity associated with the "CachedEffectiveWeek" maintained in the CALENDAR READER 102. The "CachedEffectiveWeek" is contains a WEEK 106 definition honoring the inheritance relationships between CALENDARs 104 in the effective calendar and any EFFECTIVE WEEK records occurring on those calendars for a particular date range. That range may be as small as a single week (i.e. the CachedEffectiveWeek is only valid for seven days). The window (range) of validity is recorded by the "CachedWeekStartDay" to "CachedWeekEndDay" fields in the CALENDAR READER 102. Control then transfers to query operation 416.

In query operation 416, the query is made as to whether DATE falls within the validity window of the CachedEffectiveWeek. If it does, control transfers to operation 418. If not, control transfers to operation 420.

In operation 420, a new CachedEffectiveWeek containing DATE is computed. The week is always computed so that it begins on a Sunday and ends on a Saturday. By way of example, if DATE is Oct. 27, 2004, the new CachedEffectiveWeek would be at a minimum valid from Oct. 24, 2004 through Oct. 30, 2004. Depending on the structure of the relevant CALENDARs, it may be valid for a period longer than seven days. The generated week and its range of validity are stored in the CALENDAR READER. Control then transfers to operation 418.

In operation 418, we know that the CachedEffectiveWeek is valid for DATE. The appropriate DAYINFO (based on the weekday identity of DATE) is extracted from the CachedEffectiveWeek for DATE. Control then passes to return operation 422, where the DAYINFO for the requested DATE is returned to the client.

Although the invention has been described in language specific to structural features, methodological acts, and computer readable media containing such acts, it is to be understood that the invention defined in the appended claims is not necessarily limited to the specific structure, acts or media described. Therefore, the specific structure, acts or media are disclosed herein only as preferred forms of implementing the claimed invention. They should not be interpreted as limiting the scope of the present invention. Further, many variations and changes and alternatives will readily suggest themselves to one ordinarily skilled in the art. Accordingly all such variations, changes and alternatives are also within the intended broad scope and meaning of the invention as defined by the appended claims.

What is claimed is:

1. A method of handling allocation of task work to resources to establish day state information, the method comprising:
   defining, by a processor of a computer system, one or more base calendars and a resource calendar associated with each resource, wherein the resource calendar inherits from one of the one or more base calendars, and wherein each of the calendars defines a standard week;
   defining, by the processor, a calendar reader, a set of recurring exception records each containing exception data, wherein each recurring exception record comprises a rule for determining when an exception occurs for a resource, the exception comprising a deviation from the standard week;
   defining, by the processor, a set of effective weeks for each calendar, wherein each effective week defines it a time range between an effective start day and an effective end day in which an exception occurs and for which the exception is valid, the time range spanning more days than the exception;
   receiving, by the processor, a request for day state information for a first date;
   determining, by the processor, whether an exception expansion window in the one or more base calendars and the resource calendar associated with each resource includes the first date, wherein the exception expansion window is defined by an expansion range indicated by an expanded start day and an expanded end day;
   upon determining that the first date is outside the expansion range, growing, by the processor, the expansion range to define a new exception expansion window including the first date;
   inspecting, by the processor, the recurring exception records to determine whether any new exceptions exist in the new exception expansion window;
   upon determining that new exceptions exist in the new exception expansion window, adding, by the processor, the new exceptions to the one or more base calendars and the resource calendar associated with each resource;
   determining, by the processor, whether an exception exists in the one or more base calendars and the resource calendar associated with each resource;
   when an exception exists, computing, by the processor, an effective week honoring the exception data from one of the records in the set of recurring exception records and ignoring the calendar's standard week;
   when an exception does not exist, computing, by the processor, an effective week for the resource from a combination of the calendar's standard week and associated effective week records;
   caching, by the processor, the effective week;
   establishing, by the processor, the day state information from the cached effective week; and
   returning, by the processor, the day state information for display on a display device to a client.

2. The method according to claim 1 wherein the day state information comprises shift data for the resource.

3. The method according to claim 2 wherein the shift data for the day state information is selected from a predetermined set of possible shifts.

4. The method according to claim 1 further comprising:
   determining whether another exception exists in the effective week for the resource on one of the base calendar and resource calendar;
   when the another exception exists, computing a modified effective week including the another exception from the recurring exception record;
   when another exception does not exist, caching the effective week.

5. The method according to claim 4 further comprising repeating the determining and computing and caching operations for any further exceptions within the effective week.

6. A system comprising:
   a processor; and
   a memory coupled with and readable by the processor and containing a series of instructions that, when executed by the processor, cause the processor to:
   define one or more base calendars and a resource calendar associated with each resource, wherein the resource calendar inherits from one of the one or more base calendars, and wherein each calendar defines a standard week, a calendar reader, a set of recurring exception records each containing exception data, wherein each recurring exception record comprises a rule for determining when an exception occurs for a resource, and wherein the exception comprises a deviation from the standard week;
   define a set of effective weeks for each calendar, wherein each effective week defines a time range between an effective start day and an effective end day in which the exception occurs and for which the exception is valid, the time range spanning more days than the exception;
   receive a request for day state information for a first date;
   determine whether an exception expansion window in the one or more base calendars and the resource calendar associated with each resource includes the first date, wherein the exception expansion window is defined by an expansion range indicated by an expanded start day and an expanded end day;
   upon the determination that the first date is outside the expansion range, grow the expansion range to define a new exception expansion window including the first date;
   inspect the recurring exception records to determine whether any new exceptions exist in the new exception expansion window;
   upon the determination that new exceptions exist in the new exception expansion window, add the new exceptions to the one or more base calendars and the resource calendar associated with each resource;
   determine whether an exception exists in the one of the base calendars and the resource calendar associated with each resource;
   when an exception exists, compute an effective week honoring the exception data from one of the records in the set of recurring exception records and ignoring the calendar's standard week;
   when an exception does not exist, compute an effective week for the resource from a combination of the calendar's standard week and associated effective week records;
   cache the effective week; and
   establish the day state information from the cached effective week.

7. The system according to claim 6 wherein the day state information comprises shift data for the resource.

8. The system according to claim 6 wherein the series of instructions cause the processor to:
   determine whether another exception exists in the effective week for the resource on one of the base calendar and resource calendar;

when the another exception exists, compute a modified effective week including the another exception from the recurring exception record;

when another exception does not exist, cache the effective week.

9. A computer program product comprising computer-executable instructions stored on a computer readable medium which, when executed by a processor of a computer system, cause the processor to perform a method for:

defining a base calendar and a resource calendar associated with a resource, wherein the resource calendar inherits a plurality of attributes from the base calendar, wherein the resource calendar can redefine one or more of the attributes of the base calendar, and wherein each of the calendars defines a standard week, a calendar reader and a recurring exception record for the resource, wherein the recurring exception record comprises a rule for determining when an exception occurs, wherein the exception comprises a deviation from the standard week;

defining a set of effective weeks for each calendar, wherein each effective week defines in a time range for a resource between an effective start day and an effective end day in which an exception occurs and for which the exception is valid, the time range spanning more days than the exception;

receiving a request for day state information for a first date;

determining whether an exception expansion window in the base calendar and the resource calendar associated with the resource includes the first date, wherein the exception expansion window is defined by an expansion range indicated by an expanded start day and an expanded end day;

upon determining that the first date is outside the expansion range, growing the expansion range to define a new exception expansion window including the first date;

inspecting the recurring exception records to determine whether any new exceptions exist in the new exception expansion window;

upon determining that new exceptions exist in the new exception expansion window, adding the new exceptions to the base calendar and the resource calendar associated with the resource;

determining whether an exception exists in the base calendar and the resource calendar associated with the resource;

when an exception exists, computing an effective week including the exception from the recurring exception record;

when an exception does not exist, computing an effective week for the resource from a standard week;

caching the effective week; and establishing the day state information from the cached effective week.

10. The computer program product according to claim 9 wherein the day state information comprises shift data for the resource.

11. The computer program product according to claim 10 wherein the shift data for the day state information is selected from a predetermined set of possible shifts.

12. The computer program product according to claim 9 wherein the method further comprises:

determining whether another exception exists in the effective week for the resource on the base calendar and resource calendar;

when the another exception exists, computing a modified effective week including the another exception from the recurring exception record;

when another exception does not exist, caching the effective week.

13. The computer program product according to claim 12 wherein the method further comprises repeating the determining and computing and caching operations for any further exceptions within the effective week.

* * * * *